No. 762,294. Patented June 14, 1904.

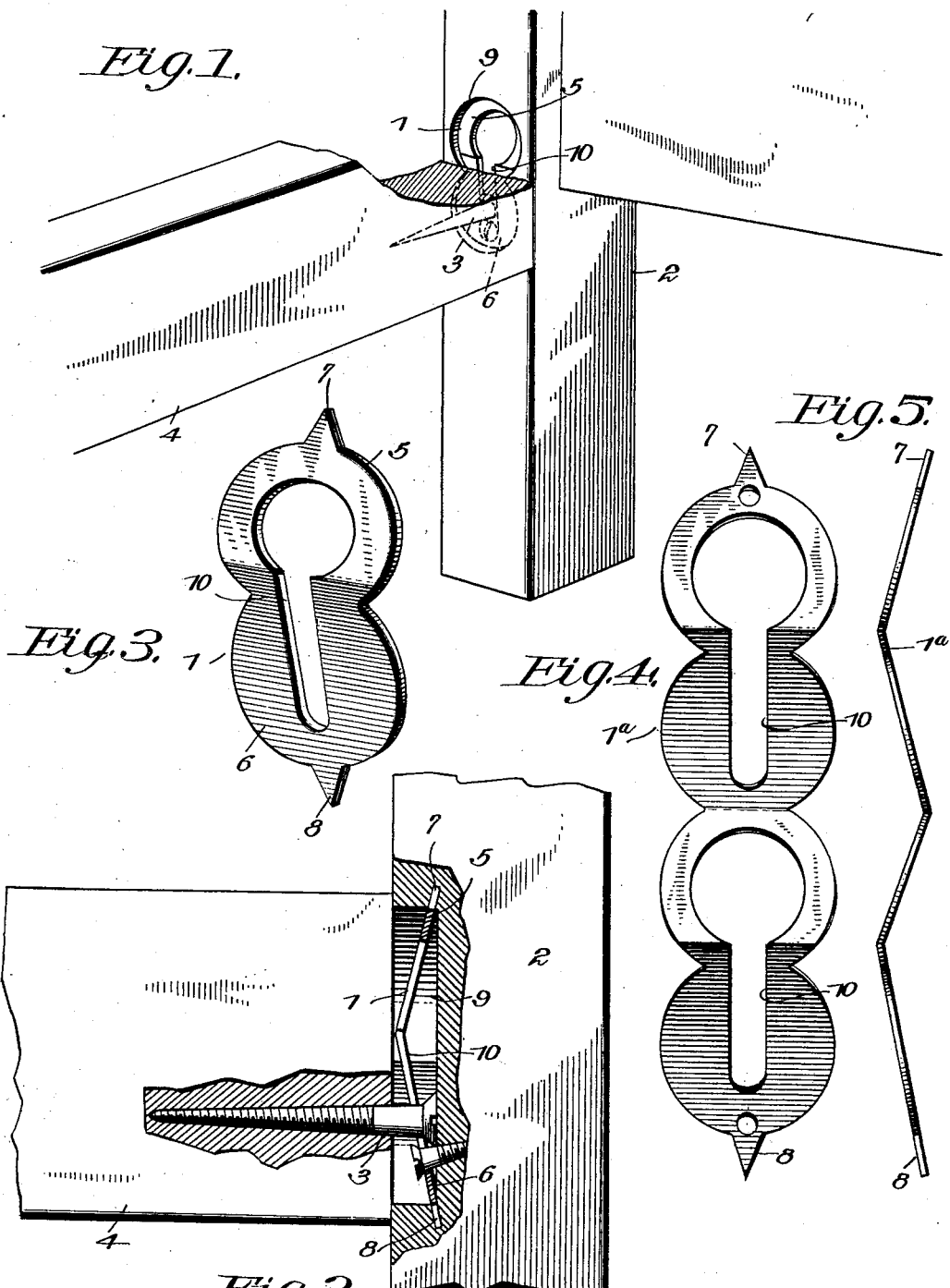

UNITED STATES PATENT OFFICE.

JOHN E. FAUGHT, OF COLUMBIA CITY, INDIANA.

FURNITURE-JOINT FASTENING.

SPECIFICATION forming part of Letters Patent No. 762,294, dated June 14, 1904.

Application filed April 1, 1903. Serial No. 150,656. (No model.)

*To all whom it may concern:*

Be it known that I, JOHN E. FAUGHT, a citizen of the United States, residing at Columbia City, in the county of Whitley and State of Indiana, have invented a new and useful Furniture-Joint Fastening, of which the following is a specification.

The invention relates to a joint-fastener particularly designed for furniture and adapted for securing in their operative relations the meeting members of an article of furniture, such as the side rails and posts of a bedstead or the frame-bars and uprights of a chair, sofa, or the equivalent thereof; and the object of the invention is to provide a simple, inexpensive, and efficient fastener adapted to be applied with facility and having a combined wedging and spring action, whereby the members of the articles of furniture are held in close frictional contact to prevent yielding vibration and consequent creaking.

Further objects and advantages of the invention will appear in the following description, and the novel features thereof will be particularly pointed out in the appended claims, it being understood that changes in the form, proportion, and the minor details of construction may be resorted to without departing from the spirit or sacrificing any of the advantages of the invention.

In the drawings, Figure 1 is a view of a fastener constructed in accordance with the invention applied in operative position with the connected members of an article of furniture.
Fig. 2 is a sectional view of the same. Fig. 3 is a detail view of the fastener detached. Fig. 4 is a plan view of a slightly-modified form of fastener, and Fig. 5 is a vertical longitudinal sectional view of the same.

In the preferred embodiment of the invention, as illustrated in the accompanying drawings, the fastener consists of a spring-metal plate 1, which is elongated and is provided with terminal means of attachment to an article of furniture, such as the upright 2, and a headed pin or bolt 3, projecting from the extremity of the furniture member 4, which is to be connected to the upright. In the construction illustrated the plate consists of connected disk-like elements 5 and 6 and is formed with oppositely-disposed terminal supports radially projecting from the ends of the plate. These supports are in the form of spurs or tines (designated by the reference 7 and 8) and are pointed to facilitate the driving thereof into the wall of a countersink or recess 9, formed in the furniture member. In practice the entire plate intermediate its ends is arched or unsupported to provide for the yielding thereof and is arranged in an oblique position with relation to the furniture member, whereby when the head of the pin 3 is engaged with the keyhole-slot 10 therein and is forced longitudinally of the plate from the enlarged portion of said slot along the reduced portion thereof the head passing in rear of the plate will have a tendency to slightly spring the plate outward, and thus cause the drawing of the furniture member 2 to insure a tight joint. The reduced portion of the keyhole-slot 10 runs longitudinally of one of the disk members and merges into the enlarged portion of said slot in the other disk member and beyond the intersecting connecting portion or apex of the plate. The bend of the plate is therefore to one side of the transverse center thereof and at the point of intersection of the reduced portion with the enlarged portion of the slot. This will give a greater angle of inclination to the plate member having the enlarged portion of the slot than will be provided for the disk member having the reduced portion. As a result the headed pin 3 can quickly engage with the slot 10, and said pin will have a relatively greater longitudinal movement in the slot, so as to gradually but firmly draw the two meeting members of the furniture together. The angle of inclination can be governed by the length of the countersink or recess 9, because when the radial supporting-spurs 7 and 8 are driven into the ends of the countersink the ends of the disk members 5 and 6 will constitute stops to prevent the two members from being bent back into longitudinal alinement with each other.

In applying the fastener the countersink or recess having been formed of less length than the plate the latter is arranged in an inclined position by bending it transversely to one side of its center, as indicated in Fig. 3, so as to dispose the points of the terminal spurs in contact with the end walls of the countersink or recess, and by tapping the face of the plate the spurs are driven into the end walls of the countersink, so as to secure said plate in proper position to be engaged by the headed pin 3.

The bending of the plate adds stiffness thereto by placing the parts under tension, and thus guards against looseness or rattling, particularly when the headed pin having been engaged with the enlarged portion of the keyhole-slot is forced longitudinally of the plate to add to the flection.

Any tendency of the lower spur to be forced outward or withdrawn from the end wall of the countersink or recess 9 will be overcome by the resistance of the headed pin or screw 11 passing through the reduced portion of the slot and inserted therein after the spurs have been driven into the ends of said countersink.

In the modified form illustrated in Figs. 4 and 5 a plurality of duplicate plates (designated 1ⁿ) are connected, this form of fastener being preferably employed for special purposes—as, for instance, kitchen-cabinets, bedsteads, and the like. This form of fastening may or may not be supplied with the end spurs, as it may be advantageous to employ fastening-screws instead.

As placed upon the market the fasteners can consist of flat plates struck from a single piece of metal and afterward bent before being applied. This arrangement would be advantageous in packaging, although they may be stamped out and bent to proper form to be placed upon the market, if desired.

Having thus described my invention, what I claim is—

1. A supporting member for joint-fastening devices comprising an elongated normally arched bendable plate with an elongated slot therein, and oppositely-disposed terminal fastening devices carried by the plate.

2. The combination with a furniture member, having a countersink or recess, and an abutting member having a terminally-headed pin of a bendable intermediately-unsupported plate within the recess and terminally abutting against the end walls of the recess and spurs on the respective ends of the plate.

3. The combination with a furniture member, having a countersink, of a bendable arched plate having opposite terminal spurs extending in the plane of the adjacent portions of the plate for engagement with the walls of the countersink, said plate being of a greater length than the recess.

In testimony that I claim the foregoing as my own I have hereto affixed my signature in the presence of two witnesses.

JOHN E. FAUGHT.

Witnesses:
 JOHN BERRINGER,
 P. H. OLUGSTON.